April 19, 1932.  E. A. THOMPSON  1,854,281
CLUTCH MECHANISM FOR TRANSMISSIONS
Filed Aug. 2, 1926   2 Sheets-Sheet 1

Inventor:
Earl A. Thompson,
By Milans & Milans
Attorneys

April 19, 1932. E. A. THOMPSON 1,854,281
CLUTCH MECHANISM FOR TRANSMISSIONS
Filed Aug. 2, 1926   2 Sheets-Sheet 2

Patented Apr. 19, 1932

1,854,281

UNITED STATES PATENT OFFICE

EARL A. THOMPSON, OF PORTLAND, OREGON, ASSIGNOR TO GENERAL MOTORS CORPORATION, OF DETROIT, MICHIGAN, A CORPORATION OF DELAWARE

CLUTCH MECHANISM FOR TRANSMISSIONS

Application filed August 2, 1926. Serial No. 126,639.

My invention relates to new and useful improvements in clutch mechanism for transmissions and has for its principal object the provision of such a mechanism which is relatively simple and inexpensive in construction, which may be constructed with the addition of only a very few parts to the transmission now commonly in use and in which speed changes may be effected without clash.

A further object of the invention resides in the provision of novel means whereby the speeds of the members to be meshed may be synchronized and in which sufficient time is allowed for synchronization, during the shifting of the elements, so that the members may be intermeshed without clash.

A still further object of the invention resides in the provision of shift rods adapted to be operated through the usual form of shift lever and means whereby the movement of the shift rods may initially set into operation the synchronizing mechanism and then operate the shiftable element to be meshed with the desired speed gear.

As another object of the invention I provide novel means for lubricating the bearings of certain of the gears, said lubrication being forced to the bearings under pressure.

With the above and other objects in view, which will appear as the description proceeds, my invention consists in the novel details of construction, and arrangements of parts, described in the following specification and illustrated in the accompanying drawings, and while I have illustrated and described the preferred embodiments of the invention, as they now appear to me, it will be understood that such changes may be made as will fall within the scope of the appended claims.

The invention is illustrated and described as embodied in a motor vehicle change-speed gear assembly wherein it is of exceptional utility.

In the drawings 1 indicates the transmission casing or housing of usual construction, 2 the engine clutch shaft, 3 the driven shaft, and 4 the counter shaft. The clutch shaft 2 is supported by the roller bearing 5 and the driven shaft 3 by the ball bearing 6. The forward end of the driven shaft 3 is reduced as shown at 7 to telescope within the end of the clutch shaft 2, as shown more particularly in Fig. 1 of the drawings, and this reduced end of the driven shaft is supported by the roller bearing 8. The inner end of the clutch shaft 2 is enlarged as shown at 9 and provided with the conical recess 10, teeth 11 being formed interiorly of the recess adjacent the outer end thereof, thus constituting one element of a jaw clutch. The enlarged end 9 is provided with the circumferentially extending groove 12 for a purpose to be later described.

Figure 1:
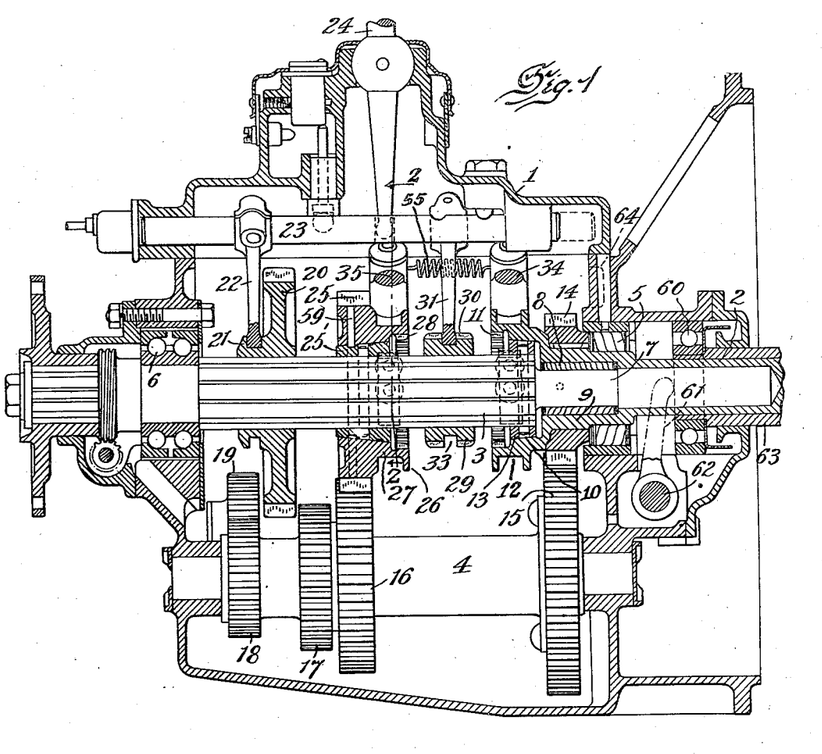
Fig. 1 is a longitudinal vertical section through the transmission with parts shown in elevation.

The driven shaft 3 is splined and has secured thereto the conical member 13 which is received within the recess 10 and normally out of engagement therewith so that the enlarged recessed end of the shaft 2 is normally freely rotatable relative to the member, the shaft 2 being longitudinally slidable, in a manner to be later described, so as to form engagement between the conical member 13 and the wall of the conical recess 10 to provide a direct drive between the shafts 2 and 3. Member 13 with its conical outer surfaces, and that portion of the enlarged end of shaft 2 that is provided with the internal conical recess 10, constitute companion elements of a friction clutch adapted frictionally to couple the coaxial power transmission members to wit: shafts 2 and 3.

Secured to the clutch shaft 2 is the gear 14 which meshes with the counter shaft gear 15 for driving said counter shaft. Formed on or secured to the counter shaft are the gears 16, 17 and 18, the gear 18 being in mesh with the reverse idler gear 19.

Slidably mounted on the shaft 3 is the gear 20 which when moved to the right of the position shown in Fig. 1 meshes with the gear 17 to provide "low gear" and when moved to the left, from its neutral position, shown in Fig. 1, meshes with the reverse idler gear 19 to provide "reverse gear". This gear 20 has the grooved collar 21 in which is received the forked end of the arm 22 carried by the shifter rod 23. The shifter rod 23 will be operated by the shift lever 24 in the usual manner.

At all times in mesh with the gear 16 is the gear 25 which is normally freely rotatable on the conical member 25' which is splined and secured to the driven shaft 3. Formed on one face of the gear 25 is the extension 26 having the circumferentially extending groove 27 and formed interiorly of the extension are the teeth 28.

The inner internal conical part of gear 25 and the external conical member 25' constitute companion elements of a friction clutch adapted to couple frictionally the coaxial power transmitting members 3 and 25.

Slidably mounted on the driven shaft 3 is the coupling member 29 having the external teeth 30 adapted when shifted to the right of the neutral position shown in Fig. 1 to mesh with the internal teeth 11 of the shaft 2 and when moved to the left of the neutral position shown in Fig. 1 to mesh with the internal teeth 28 of the gear 25. The coupling member is operated through means of the arm 31 carried by the shifter rod 32, the lower end of the arm being forked and said forked end being received in the groove 33 of the coupling member.

Member 29 constitutes a double-ended element of two jaw clutches, the jaws or teeth on one end of which are adapted to be intermeshed with the companion jaws or teeth 11 on shaft 2 and those on the other end to be intermeshed with the companion jaws or teeth 28 on gear 25, thus positively coupling in the one case coaxial transmission members 2 and 3 and in the other case coaxial transmission members 3 and 25.

Figure 2:
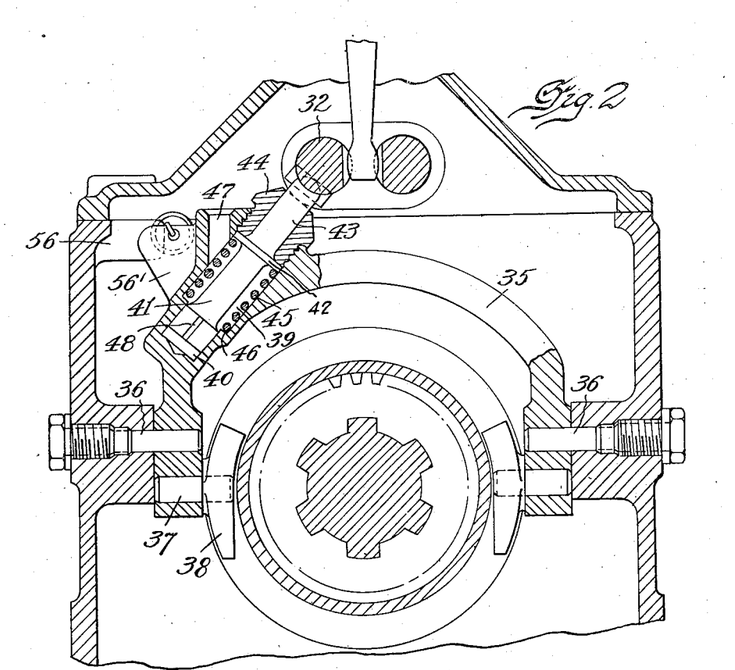
Fig. 2 is a fragmental transverse vertical section on the plane indicated by line 2—2 of Fig. 1 with parts shown in elevation.

For drawing the conical recessed end of the shaft 2 into engagement with the conical member 13 and the gear 25 into engagement with the conical member 25' I provide the yokes 34 and 35 respectively. Said yokes constitute power multiplying levers the power arms of which are releasably locked to shifter rod 32 by latch bolts, spring urged to locking positions, associated with fluid internal resistance devices, such as hydraulic dashpots, which resist and delay release of the bolts until the precalculated relation of pressure and time factors necessary to effect synchronization occurs. As these yokes and their associated parts are of a similar construction a detailed description of one will suffice for both. As shown in Fig. 2 the yokes are pivotally mounted on the pins 36 which pass through the sides of the transmission casing or housing and the yokes are adapted for rocking movement upon operation of the shifter rod 32. Pivotally mounted adjacent the lower ends of the arms of the yokes 35 by means of the pins 37 are the thrust blocks 38, the thrust blocks carried by the yoke 35 being received in the circumferentially extending groove 27 of the gear 25 while the thrust blocks carried by the yoke 34 are received in the circumferentially extending groove 12 of the enlarged end 9 of the shaft 2. Each of the yokes has formed therein a recess, the lower end of which is reduced in diameter thus forming chambers 39 and 40. The lower end of the plunger 41 is of a diameter to form a sliding fit in the chamber 40, said plunger having a flange 42 and an extension 43, the extension passing through a central opening formed in the threaded cap 44 received in the outer threaded end of the recess. A coiled spring 45 surrounds the plunger 41 between the flange or collar 42 and the shoulder 46 formed by the reduction in the diameter of the lower end of the recess, said coiled spring normally holding the plunger in its raised position as shown more particularly in Fig. 2 of the drawings. The extension 43 of the plunger constitutes a latch bolt which bears against the shift rod 42; its end is semispherical.

For introducing or supplying a lubricant to the chamber 39 I provide an opening 47 through which the lubricant is introduced by splashing due to the operation of the transmission gears. This lubricant is allowed to pass into the chamber 40 through the groove 48 formed longitudinally of that portion of the plunger operating within the chamber.

Figures 3, 4:
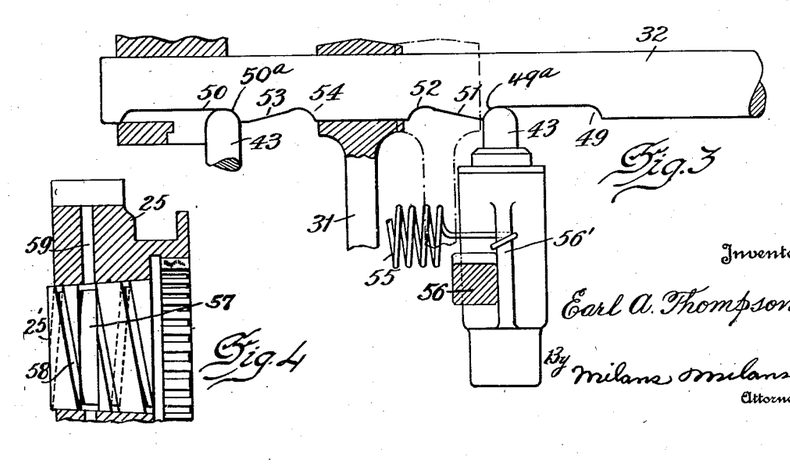
Fig. 3 is a fragmental elevation showing a detail of one of the shifter rods and the engaging member therefor, this view being taken from that side of the transmission opposite to that shown in Fig. 1.
Fig. 4 is a detail of the gear bearing.

The shifter rod 32 shown more particularly in Fig. 3 of the drawings is formed with the longitudinally spaced elongated recesses 49 and 50, the ends of the recesses being rounded substantially the same radius as the semispherical ends of the extension 43 of the plunger thus forming keepers. Extending from that end of the recess 49 adjacent the shifter arm 31 is the inclined surface 51 which terminates into the rounded recess 52. Extending from that end of the recess 50, adjacent the shifter arm 31, is the inclined surface 53 which terminates into the rounded recess 54. Secured to and positioned between the yokes 34 and 35 is the coiled spring 55 which normally tends to rock the upper ends of the yokes towards each other, such movement being limited by the stop 56 secured in the casing or housing 1 which engages an ear or projection 56′ which is formed on or secured to the yoke.

The conical member 25′ is formed with the annular groove 57 which is intersected by the helical groove 58 also formed in the conical member and extending the entire length thereof. Communicating with the annular groove 57 and for supplying lubricant thereto, are one or more openings 59 formed in the gear 25 and extending from the bottom of the surface between adjacent teeth as more particularly illustrated in Figs. 1 and 4 of the drawings. As the gear 25 rotates in mesh with the gear 16 the lubricant gathered by the teeth of these gears is forced through the openings 59 into the annular groove 57 and passes through the spiral groove 58.

Positioned within an extension on the casing or housing 1 is a ball bearing 60 adapted to be operated by the fork 61 carried by the clutch rock shaft 62 and the purpose of this bearing is to take the thrust of releasing the clutch which connects the motor to the transmission through means of the sleeve 63. This clutch may be of any convenient conventional form. The outer race of the roller bearing 5 is held within the transmission casing or housing against both rotatable and longitudinal movement by means of the pin 64, the lower end of the pin being reduced and received in an opening formed in the race.

In the drawings the parts are shown in neutral position. To shift into "low" speed or into "reverse" gear the gear 20 is operated from the shifter rod 23 in the usual manner. It is the purpose of the present invention to synchronize the transmission elements so that the coupling member 29 may be shifted into position for "second" or "high" speed without clash. When it is desired to shift into "second" gear the shift lever 24 is operated to move the shifter rod 32 to the right as shown in Fig. 3 and to the left as shown in Fig. 1, this movement of the shifter rod causing shoulder 49a at that end of the recess 49 adjacent the beveled surface 51 to engage the upper end of the extension 43 of the plunger 41 and rock the yoke 35 so that the thrust blocks 38 will force the gear 25 into tight frictional engagement with the conical member 25′ so that the gear will rotate with the conical member and establish a synchronized condition between the gear 25 and the coupling 29 in order that the teeth 28 of the gear may be readily meshed with the teeth 30 of the coupling without clash. The resistance developed by the gear 25 being placed into tight frictional engagement with the conical member 25′ will cause the plunger 41 to be lowered against action of the coiled spring 45 this allowing the end of the extension 43 to pass from engagement with the shoulder 49a at the end of the recess 49 and to pass over the inclined surface 51 to position for engagement in the rounded recess 52. In addition to the pressure of the spring 45 on the plunger 41 there will be a hydraulic pressure within the chamber 40 and as the plunger is lowered the lubricant within the chamber 40 will pass through the groove or passage 48 to the opposite side of the enlarged lower end of the plunger and into the chamber 39. The hydraulic pressure retards the downward movement of the plunger and if an attempt should be made to operate the shift so quickly as not to allow sufficient time for synchronization the hydraulic pressure within the chamber 40 would be sufficient to hold the upper end of the plunger in engagement with the end of the recess in the shifter rod a sufficient length of time to allow for proper synchronizing. This same action increases the pressure to rock the yoke and more tightly force the gear into engagement with its associated conical member. Resistance to the movement of the operating means is increased as the speed of the movement of said operating means is increased. In other words the resistance varies according to the rate of movement of the operating means. It will be understood that the hydraulic pressure may be increased or decreased by varying the diameter of the plunger, the size of the chamber 40 in which the end of the plunger operates, or the size of the groove or passage 48. The engagement of the shoulder 49a at the end of the recess 49 with the end of the extension 43 of the plunger operates to restrain the shifting of the shift rod to allow time for synchronization and as just described the dash pot effect of chamber 40 and plunger 41 further augments this restraint for controlling the synchronizing time element as desired. It will be understood that the hydraulic pressure developed in the chamber 40 will vary with the viscosity of the transmission oil therein and inasmuch as the viscosity of the oil varies from time to time due to changes in temperature the retarding effect on the depression of the plunger 41 will be increased as the viscosity of the oil increases so that, as for example in cold weather, the transmission oil becomes heavy and consequently a greater power is necessary to synchronize the gears. The hydraulic action will furnish means for allowing more time for synchronization as well as increasing the synchronizing effect. As the extension 43 of the plunger passes from engagement with the end of the recess 49 the coiled spring 55 tends to draw the yoke towards its original or normal position against the stop 56 and this movement removes the restraint on the shifter rod 32 and allows the latter to be accelerated to move the coupling member 29 into engaging position with the teeth 28 of the gear 25, this movement being further augmented by the end of the extension 43 of the plunger bearing against the inclined surface 51. The engagement of the extension in the rounded recess 52 holds the shifter rod in its shifted position. In the event that the teeth of the coupling member 29 abut the internal teeth 28 of the gear 25 said gear 25 will be tapped free of or disengaged from its engagement with the conical member 25' so as to allow the gear 25 to have a slight rotary movement in order that the teeth 28 thereof may be meshed with the teeth 30 of the coupling member 29.

The angle of the conical member 25' and its corresponding or cooperating gear 25 is such that when these two parts are brought into tight frictional engagement they will continue to transmit a substantially normal amount of torque without the aid of axial pressure from the yoke 35 tending to hold them in tight frictional engagement while at the same time the gear 25 can be released from frictional engagement with the conical member 25' by the nominal amount of axial pressure produced by the spring 55 when augmented by a slight blow from the coupling member 29. What has been said relative to the angle of the conical member 25' and its associated gear 25 is applicable to the conical member 13 and its associated member 10 formed on the inner end of the shaft 2.

The helical groove 58 in the conical member 25' is in such a direction as to, when operating under the severest load conditions, have a tendency through the screwing action of this spiral to draw the conical member and gear together to increase the frictional effect upon the members. Another advantage to be gained by this spiral groove 58 is that it breaks up the surface of the conical member 25' so that during the clutching action the surplus film of oil can be squeezed out more readily as the distance it must flow is lessened.

Considerable importance is attached to the selection of the material for the friction surfaces of the conical members and their associated members adapted to be brought into frictional engagement therewith. In actual practice I have found it advantageous to have one of said members of an extremely hard material such as hardened steel and the other member of a relatively softer material composed of soft matrix in which is embedded very hard crystals for supporting the loads, for example certain bronze alloys.

In going from "second" gear to "high" gear it will be understood that the shifter rod 32 will be moved in the opposite direction and operate the yoke 34, and its associated parts in the same manner as has been described in operating the yoke 35, the yoke 34 being rocked through engagement of the extension 43 of the plunger 41 of that yoke with the shoulder 50a at the end of the recess 50. When the yoke 34 is operated the enlarged recessed end 10 of the shaft 2 is drawn into frictional engagement with the conical member 13 thereby synchronizing the speed of said enlarged recessed end with the speed of the coupling member 29 so that the teeth 30 of said coupling member may be meshed with the teeth 11 of the enlarged end 10, the shifter rod being held in its shifted position by engagement of the end of the extension 43 in the rounded recess 54.

When the coupling member is in neutral position it is spaced sufficiently far away from the members with which it is to be meshed so that before the teeth of the coupling member mesh with the teeth of the cooperating power member there is sufficient movement of the shifter rod to effect engagement of the synchronizing members, to allow for normal wear between said synchronizing members, and to allow the extension 43 of the plunger carried by the yoke to pass from engagement with the end of the recess with which it is normally engaged in neutral position.

Figure 5:
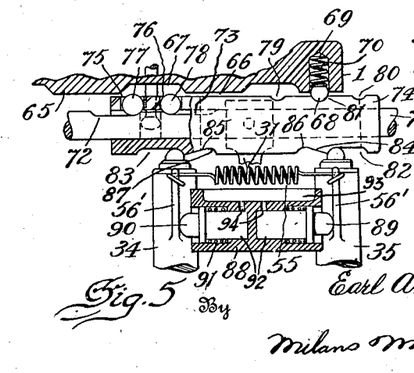
Fig. 5 is a fragmental detail, partly in section and partly in elevation, showing a slightly modified form of shifter rod and mechanism therefor.

In Fig. 5 of the drawings I have illustrated a slightly modified form of synchronizing control and shifter mechanism in which a portion of the transmission casing or housing 1 is provided with the extending ledges 65 and 66 forming the elongated recess 67 therebetween. A ball 68 is operable in an opening 69 formed in the casing or housing 1 and is normally pressed outwardly by means of the coiled spring 70. At 71 I have shown a shifter rod corresponding to the shifter rod 32 and said shifter rod 71 is provided with the elongated recesses 72 and 73. Secured to the rod 71 is the arm 31 which is adapted to operate the shiftable member 29. Slidably mounted on the shift rod 71 is the member 74, said member 74 being operated through means of the shift lever 24. The member 74 bears on the shift rod only at each end and there are bridge portions connecting the two ends and passing around the arm 31. Formed in the member 74 are the openings 75 and 76 in which are received the balls 77 and 78, the balls being engageable in the recesses 72 and 73 respectively and normally on opposite sides of that portion of the rod between the recesses. Formed adjacent the end of the member 74 opposite to that having the openings 75 and 76 are the concaved recesses 79, 80 and 81 in which the ball 68 is adapted to engage, the ball being shown in neutral position of the parts as engaging within the recess 81. The member 74 is provided with the longitudinally spaced elongated recesses 82 and 83, the inclined surfaces 84 and 85, and the rounded recesses 86 and 87 corresponding to the recesses 49 and 50 the inclined surfaces 51 and 53, and the rounded recesses 52 and 54, shown in the shifter rod 32 more particularly in Fig. 3 of the drawings and for the same purpose as described therefor.

In the modified form of the invention disclosed in Fig. 5 the yokes 34 and 35 are illustrated as being drawn towards one another by means of the coiled spring 55. In this form of the invention instead of using the form of stop 56 disclosed in Figs. 2 and 3 of the drawings I provide a novel form of stop including a housing 88 for the slidable plungers 89 and 90, said housing being formed on or secured to the casing or housing 1. The plungers are pressed outwardly by means of the coiled springs 91 and the outer ends of the plungers are normally in engagement with the ears or projections 56′ formed on the yokes. The inner ends of the plungers 89 and 90 are received within recesses 92 formed in the housing and the upper surface of the housing is dished or recessed as shown at 93 to form a reservoir for the transmission lubricant. Openings 94 extend from the dished or recessed portion 93 and communicate with the recesses 92 so that when the plungers 89 and 90 are in their outermost positions lubricant will pass into the recesses 92 and form a cushion against the return of the plungers to their normal positions. This cushioning action does away with any noise incident to the return of the yokes to their normal positions.

In the operation of the construction disclosed in Fig. 5 when the gear shift lever 24 is operated to place the members in "second" gear the member 74 will be moved towards the right of the figure. This movement will cause the ball 77 to rise from engagement with the end of the recess 72 into the recess 67 and this will allow the member 74 to move without movement of the shifter rod 71 and operate the yoke 35 in the manner which has been described previously as to the construction disclosed in Figs. 1, 2, 3 and 4 of the drawings. This movement of the member 74 will carry the ball 78 to position the same in engagement with the right hand end of the recess 73. At this point synchronization has been completed and further movement of the member 74 will cause the shifter rod 71 to be carried to the right and through means of the arm 31 operate the shiftable member 29. The ball 78, when the member 74 is moved to the right, is held between the bottom surface of the recess 73 and the ledge 66 and is prevented from raising out of engagement from the end of the recess 73. When the member 74 is shifted to the right, as described, the ball 68 will pass into the rounded recess 79 and hold the parts in their shifted positions. In Fig. 5 I have shown the distance between the ends of the recess 82 and the recess 86 such as to allow the wall of the recess 86 to press against the plunger carried by the yoke when the member 74 is shifted to the right and so rock the yoke as to hold the gear shifted thereby in engagement with its associated conical member during the time that it is connected to the drive shaft by means of the coupling 29 for transmitting power. The member 74 when shifted to the left as shown in the figure will return the parts to their neutral position.

Figure 6:
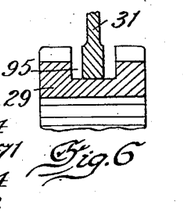
Fig. 6 is a fragmental detail showing a modified form of coupling.

To provide for lost motion between the operation of the synchronizing mechanism and the operation of the shift rod to move the shiftable element I may construct the coupling 29 as shown more particularly in Fig. 6 of the drawings. In this form of the invention a relatively wide circumferentially extending groove 95 is provided, this groove being wider than the arm 31 so that the arm may have movement relative to the coupling 29 before engaging the faces of the groove to move the same.

Figure 7:
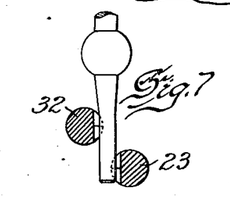
Fig. 7 is a fragmental detail, partly in section and partly in elevation, showing a modification of shifter rod construction and positioning.

In Fig. 7 of the drawings I have shown a slightly different arrangement of the shifter rods 23 and 32 whereby the shifter rod 23 may be moved a greater distance than the shifter rod 32 upon movement or operation of the shifting lever 24 it being understood that in moving either of the shifting rods the upper end of the shifting lever 24 will travel the same distance. To accomplish this I have shown the shifter rod 32 arranged at a point nearer the fulcrum point of the lever 24 than the rod 23. It will therefore be seen that when the lower end of the lever is engaged with one or the other of the shifter rods that movement of the lever a given magnitude will shift the rod 32 a less distance than it will the rod 23. While I have illustrated the rod 32 as being adapted for movement a less distance than the rod 23 it will be understood that this operation might be reversed, if desired, and the rod 32 shifted a greater distance than the rod 23.

Figure 8:
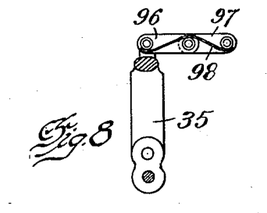
Fig. 8 shows a modified form of stop for the yokes.

In Fig. 8 I have illustrated a slightly modified form of stop for the yokes. In the construction two links 96 and 97 are provided, the link 96 being pivotally connected to the yoke and the link 97 pivotally connected to the casing or housing of the transmisison. A flat or leaf spring 98 is inserted over the pivotal points as shown so that when the top of the yoke is swung to the right this spring will depress the joined ends of the two links 96 and 97 and allow the yoke to be moved to the right. When the yoke is returned to its normal position these links will limit its movement and does so without any click or noise as might be the case if they returned against a solid stop where it would strike a blow.

Having fully described my invention what I claim as new and desire to secure by Letters Patent is:

1. A power transmission including power transmission elements one of which is shiftable relative to the other, means for synchronizing the speeds of the elements, a swinging member adapted for operating the synchronizing means, means for operating the shiftable element and swinging member, and hydraulic means carried by the swinging member and engageable with the operating means for retarding the movement of the operating means.

2. A power transmission including power transmission elements one of which is shiftable relative to the other, means for synchronizing the speeds of the elements, a swinging power multiplying member adapted to operate the synchronizing means, a shifter rod adapted to operate the shiftable element and swinging member, and a slidable plunger carried by the swinging member and engageable with the shifter rod for retarding the movement thereof.

3. A power transmission including power transmission elements one of which is shiftable relative to the other, means for synchronizing the speeds of the elements, a swinging power multiplying member adapted to operate the synchronizing means, a shifter rod adapted to operate the shiftable element and swinging member, and a spring controlled slidable plunger carried by the swinging member and engageable with the shifter rod for retarding the movement thereof.

4. A power transmission including power transmission elements one of which is shiftable relative to the other, means for synchronizing the speeds of the elements, a swinging member adapted to operate the synchronizing means, a shifter rod adapted to operate the shiftable element and swinging member, and a hydraulically controlled slidable plunger carried by the swinging member and engageable with the shifter rod for retarding the movement thereof.

5. A power transmission including power transmission elements one of which is shiftable relative to the other, means for synchronizing the speeds of the elements, a swinging member adapted to operate the synchronizing means, a shifter rod adapted to operate the shiftable element and swinging member, and a hydraulic and spring controlled slidable plunger carried by the swinging member and engageable with the shifter rod for retarding the movement thereof.

6. A power transmission including power transmission elements one of which is shiftable relative to the other, means for synchronizing the speeds of the elements, a swinging power multiplying member adapted for operating the synchronizing means in its swinging movement, a shifter rod adapted for operating the shiftable element and swinging member, said shifter rod having a recess formed therein, and means carried by the swinging member and normally received in the recess of the shifter rod, the movement of the shifter rod being retarded by engagement of the member carried by the swinging member with the end of the recess.

7. A power transmission including power transmission elements one of which is shiftable relative to the other, means for synchronizing the speeds of the elements, a swinging power multiplying member adapted to operate the synchronizing means in its swinging movement, a shifter rod adapted for operating the shiftable element and swinging member, said shifter rod having a recess formed therein, and means carried by the swinging member and normally engaged in the recess of the shifter rod, the end of the recess in the movement of the shifter rod engaging the member carried by the swinging member for initially operating the synchronizing means and allowing operation of the shiftable element as said means carried by the swinging member moves from engagement with the end of the recess.

8. A power transmission including power transmission elements one of which is shiftable relative to the other, means for synchronizing the speeds of the elements, a swinging power multiplying member adapted to operate the synchronizing means, a shifter rod adapted for operating the shiftable element and swinging member, said shafter rod having a recess formed therein, and a slidable plunger carried by the swinging member with its end normally received in the recess the end of the recess in the movement of the shifter rod engaging the plunger for initially operating the synchronizing means and allowing operation of the shiftable element as the end of said plunger passes from engagement with the end of the recess.

9. A power transmission including power transmission elements one of which is shiftable relative to the other, means for synchronizing the speeds of the elements, a shifter rod for operating the synchronizing means and shiftable element, said shifter rod having a recess formed therein and an inclined surface adjacent one end of said recess, and means engageable with the end of the recess for retarding the movement of the shifter rod and to ride over the inclined surface to accelerate movement of the shifter rod.

10. A power transmission including a power shaft and means for rotating the same, a conical bearing mounted on the shaft and having a helical groove therein, a power element normally freely rotatable relative to the bearing, a second power element shiftable relative to the first mentioned element, means for effecting tight frictional engagement between the normally freely rotatable element and its conical bearing to effect synchronization of the speeds of the power elements, and means for operating the shiftable element.

11. A power transmission including a power shaft and means for rotating the same, a conical bearing mounted on the shaft and having a helical groove therein, means for supplying a lubricant to the groove, a power element normally freely rotatable relative to the bearing, a second power element shiftable relative to the first mentoned element, means for effecting tight frictional engagement between the normally freely rotatable element and its conical bearing to effect synchronization of the speeds of the power elements, and means for operating the shiftable element.

12. A power transmission including a power shaft and means for rotating the same, a conical bearing mounted on the shaft and having a helical groove therein, means for supplying under pressure a lubricant to the groove, a power element normally freely rotatable relative to the bearing, a second power element shiftable relative to the first mentioned element, means for effecting tight frictional engagement between the normally freely rotatable element and its conical bearing to effect synchronization of the speeds of the power elements, and means for operating the shiftable element.

13. A power transmission including a power shaft and means for rotating the same, a conical bearing mounted on the shaft, a power element normally freely rotatable relative to the bearing, one of said members being of relatively hard material and the other of relatively soft material, a second power element shiftable relative to the first mentioned element, means for effecting tight frictional engagement between the normally freely rotatable element and its conical bearing to effect synchronization of the speeds of the power elements and means for operating the shiftable element.

14. A power transmission including a power shaft and means for rotating the same, a conical bearing mounted on the shaft, a power element normally freely rotatable relative to the bearing, one of said members being of relatively hard material such as hardened steel and the other being of relatively soft material such as bronze, a second power element shiftable relative to the first mentioned element, means for effecting tight frictional engagement between the normally freely rotatable element and its conical bearing to effect synchronization of the speeds of the power elements and means for operating the shiftable element.

15. A power transmission including a power shaft and means for rotating the same, a bearing mounted on the shaft, a power element normally freely rotatable relative to the bearing, a second power element shiftable relative to the first mentioned element, means for effecting tight frictional engagement and subsequent release of the normally freely rotatable member and its bearing to effect synchronization of the speeds of the power elements, and means for operating the shiftable element, the shiftable element being so spaced relative to the first mentioned element as to allow synchronization to take place prior to engagement of the elements.

16. A power transmission including a power shaft and means for rotating the same, a bearing mounted on the power shaft, a power element normally freely rotatable relative to the bearing, a shiftable power element adapted to be engaged with the first mentioned power element, means for effecting tight frictional engagement between the first mentioned power element and its bearing to effect synchronization of the speeds of the power elements and to operate the shiftable member, and means for retarding the movement of the last mentioned means to effect proper synchronization, the shiftable power element being so spaced relative to the other power element as to allow for wear between the normally freely rotatable power element and its bearing, to permit release of the retarding means, and to permit proper synchronization prior to engagement of the power elements.

17. A power transmission including power elements adapted to be moved into or out of driving relation, means for synchronizing the speeds of the power elements, means for operating the synchronizing means, and hydraulic cushioning means for limiting the return movement of the synchronizing operating means.

18. A power transmission including spaced power transmission elements, a shiftable power element mounted between the first mentioned elements and adapted to be moved into engagement with either one of the first mentioned elements, means for synchronizing the speeds of the elements, a shifter rod for operating the synchronizing means and shiftable element, said shifter rod having spaced recesses formed therein and an inclined surface adjacent one end of each of said recesses, and members normally received in each of the recesses and engageable with one end thereof for retarding the movement of the shifter rod in either direction, one of said members being adapted to ride over an inclined surface in movement of the shifter rod in either direction to accelerate the movement of the shifter rod.

19. A power transmission including spaced power transmission elements, a shiftable power element mounted between the first mentioned elements and adapted to be moved into engagement with either one of the first mentioned elements, means for synchronizing the speeds of the elements, a shifter rod for operating the synchronizing means and shiftable element, said shifter rod having spaced recesses formed therein and an inclined surface adjacent one end of each of said recesses, and yieldable members normally received in each of the recesses and engageable with one end thereof for retarding the movement of the shifter rod in either direction, one of said members being adapted to ride over an inclined surface in movement of the shifter rod in either direction to accelerate the movement of the shifter rod.

20. A power transmission including a shaft, a conical bearing mounted on the shaft, a power element normally freely rotatable relative to the bearing, a shiftable power element mounted on the shaft, a swinging member adapted to establish tight frictional engagement between the normally freely rotatable power element and its bearing to effect synchronization of the speeds of the power elements, means connected to the swinging member for normally holding the power element released from its bearing, and means for operating the shiftable element.

21. A power transmission including a shaft, a conical bearing mounted on the shaft, a power element normally freely rotatable relative to the bearing, a shiftable power element mounted on the shaft, a swinging member adapted to establish tight frictional engagement between the normally freely rotatable power element and its bearing to effect synchronization of the speeds of the power elements, means connected to the swinging member for normally holding the power element released from its bearing, means for limiting the releasing movement of the swinging element, and means for operating the shiftable element.

22. A power transmission including a shaft, a conical bearing mounted on the shaft, a power element normally freely rotatable relative to the bearing, a shiftable power element mounted on the shaft, a swinging member adapted to establish tight frictional engagement between the normally freely rotatable power element and its bearing to effect synchronization of the speeds of the power elements, means connected to the swinging member for normally holding the power element released from its bearing, an abutment engageable with the swinging member for limiting the releasing movement thereof, and means for operating the shiftable element.

23. A power transmission including a shaft, a conical bearing mounted on the shaft, a power element normally freely rotatable relative to the bearing, a shiftable power element mounted on the shaft, a swinging member adapted to establish tight frictional engagement between the normally freely rotatable power element and its bearing to effect synchronization of the speeds of the power elements, means connected to the swinging member for normally holding the power element released from its bearing, hydraulic cushioning means for limting the releasing movement of the swinging member, and means for operating the shiftable element.

24. A synchronizing clutch comprising a pair of members having co-acting conical surfaces, one of said members having an annular groove intersected by a spiral groove which extends the entire length of the member, said grooves removing surplus lubricant and increasing the frictional engagement between the members.

25. A power transmission including spaced power transmission elements, a shiftable power element mounted between the first mentioned elements and adapted to be moved into engagement with either one of the first mentioned elements, means for synchronizing the speeds of the elements, a shifter rod for operating the synchronizing means and shiftable element, said shifter rod having spaced recesses formed therein on opposite sides of the shiftable element, and members normally received in each of the recesses and engageable with the ends thereof adjacent the shiftable member for retarding the movement of the shifter rod in either direction.

26. A power transmission including spaced power transmission elements, a shiftable power element mounted between the first mentioned elements, and adapted to be moved into engagement with either one of the first mentioned elements, means for synchronizing the speeds of the elements, a shifter rod for operating the synchronizing means and shiftable element, said shifter rod having spaced recesses formed therein on opposite sides of the shiftable element and inclined surfaces between the recesses and shiftable element, and members normally received in each of the recesses and engageable with the ends thereof adjacent the shiftable member for retarding the movement of the shifter rod in either direction, one of the members being adapted to ride over an inclined surface in movement of the shifter rod in either direction to accelerate the movement of the shifter rod.

27. In a power transmission mechanism, two power transmitting members each equipped with one of two intermeshable toothed elements in torque transmitting relation, one of the toothed elements being movable into and out of interlocking engagement with its companion; a friction clutch element in torque transmitting relation to each member, one of said friction clutch elements being movable into and out of frictional driving engagement with its companion; means for releasably connecting one of said friction clutch elements to one of said toothed elements, said means comprising a self-acting lock biased to locked position, and releasable in response to adequate pressure of one friction clutch element against its companion; a fluid internal resistance brake arranged to oppose the releasing movement of said lock, and manually controllable means for moving said movable toothed element and friction clutch elements toward interdriving relation with their companions.

28. A combination as defined in claim 27 in which the fluid internal resistance brake is of the hydraulic type.

29. A combination as defined in claim 27, in which said transmission mechanism is incased in a housing adapted to contain lubricating oil, and said fluid internal resistance brake arranged to oppose the releasing movement of the lock consists of a dashpot, in further combination with means to supply the dash pot chamber with lubricant contained within the housing.

30. A combination as defined in claim 27 in which said transmission mechanism is enclosed in a housing adapted to contain lubricating oil, and said fluid internal resistance brake arranged to oppose the releasing movement of the lock consists of a dashpot, the chamber wall of which is provided with an oil inlet arranged to receive lubricating oil splashed by the transmission and direct it by gravity into the chamber.

31. A combination as defined in claim 27 in which said self-acting lock comprises a latch bolt movable transversely of the direction of relative movement of the friction clutch elements and a spring arranged to bias said latch bolt to locking position.

32. In power transmission mechanism, two coaxial power transmitting members, each equipped with one of two intermeshable jaw clutch elements and one of two interengageable friction clutch elements in torque transmitting relation to the members; one of the jaw clutch elements being movable axially into and out of mesh with its companion; one of said friction clutch elements being movable axially into and out of frictional driving engagement with its companion, and having a range of coupling and uncoupling movement shorter than the range of coupling and uncoupling movement of the movable jaw clutch elements; means for releasably connecting one of the friction clutch elements to one of the jaw clutch elements including a keeper and a cooperating latch bolt movable transversely of the path of movement of the axially movable friction clutch element, a spring arranged to bias said latch bolt into position to interlock with said keeper, and a fluid internal resistance brake arranged to resist the releasing movement of the latch bolt.

33. A combination as defined in claim 32 in which the releasable connecting means that connects the movable friction clutch element to the movable jaw-equipped member consists of a shifter arm engaging the movable jaw-equipped member, a slidable shifter rod to which said shifter arm is rigidly united, a shifter yoke engaging the movable friction clutch element, said shifter yoke and slidable shifter rod carrying, one on each, said movable latch bolt and keeper; and a shift lever for sliding the shifter rod.

34. A combination as defined in claim 32 in which the releasable connecting means that connects the movable friction clutch element to the movable jaw-equipped member consists of a shifter arm engaging the movable jaw-equipped member, a slidable shifter rod to which said shifter arm is rigidly united, and a shifter yoke consisting of a lever having its power arm releasably engaging said shifter rod by means of said latch bolt and a shorter work arm engaging the movable friction clutch element.

35. In power transmission mechanism, two coaxial power transmitting members, each equipped with one of two intermeshable jaw clutch elements and one of two interengageable conical friction clutch elements in torque transmitting relation to said member; one of said jaw-equipped members surrounding and axially movable with respect to one of said friction clutch elements; means for releasably connecting said axially movable friction clutch element to one of said jaw clutch elements for effecting simultaneous axial movement, said means comprising a self-acting lock biased to locking position and releasable in response to adequate pressure of one friction clutch element against its companion, and manually controllable means for axially moving one of the jaw-equipped members and thereby the releasably connected friction clutch element toward their companions.

36. In power transmission mechanism, a power shaft, a power transmitting element normally loose thereon, said power transmitting element being equipped with clutch jaws and a conical friction clutch surface; companion elements equipped with clutch jaws and a conical friction surface in torque transmitting connection with said shaft; one of said jaw-equipped elements surrounding and being axially movable with respect to one of said conical friction surfaces; means for releasably connecting one of said friction surface-equipped members to one of said jaw-equipped members for effecting simultaneous axial movement, said means comprising a self-acting lock biased to locking position and releasable in response to adequate pressure of one friction surface against its companion; and manually controllable means for moving one of the jaw-equipped elements and thereby the releasably connected friction surface-equipped element toward their companions.

37. In a power transmission mechanism, two coaxial power transmitting members; a jaw clutch element non-rotatively secured to each member, one of said jaw clutch elements being movable into and out of mesh with its companion; a friction clutch element non-rotatively secured to each member adjacent each jaw clutch element, one of said friction clutch elements being movable into and out of frictional driving engagement with its companion and having a range of coupling and uncoupling movement shorter than that of the movable jaw clutch element; means mechanically connected to said movable jaw clutch element and said movable friction clutch element whereby initial movement of the former toward its companion moves the latter toward its companion, said means including an elastically yieldable member and a fluid internal resistance brake associated therewith, said brake being arranged to become effective in response to interengagement of the friction clutch elements so as to resist and delay further movement of the jaw clutch element, said means being further constructed and arranged to relieve the resistance to advance of the jaw clutch element into engagement with its companion in response to a force, due to the contact of the friction clutch elements, sufficient to overcome the elastic and fluid brake resistance.

38. A power transmission mechanism including power transmission elements relatively shiftable into and out of interdriving engagement, frictional means for synchronizing speeds of the power transmission elements, a manually controllable lever for effecting interengagement of the power transmission elements and synchronizing means; mechanical connections in parallel between said lever, one of the power transmitting elements, and the frictional synchronizing means, said power transmitting element having a longer range of movement than that of the frictional synchronizing means; and a fluid friction brake rendered effective by engagement of the frictional means and arranged to prolong the engagement of the frictional means to delay the engagement of the power transmission elements.

39. In power transmission mechanism, two power transmitting members, each equipped with one of two intermeshable toothed elements in torque transmitting relation, one of the toothed elements being movable axially into and out of interlocking engagement with its companion; a friction clutch element in torque transmitting relation to each member, one of said friction clutch elements being movable into and out of frictional driving engagement with its companion, and having a lesser amplitude of movement than the movable toothed element; means for releasably connecting the movable friction clutch element with the movable toothed element so that they are compelled to move in unison toward their companions, said means comprising a keeper in fixed relation to one of said movable elements, a self acting lock plunger, movable with the other movable element, biased to engage the keeper, and operable in a direction transverse of the movement of said movable elements toward interengaging position, means constructed and arranged yieldably to resist releasing movement of the lock plunger; and having the characteristic of increasing resistance in proportion to increasing speed of the lock plunger during its releasing movement, said plunger being releasable in response to adequate pressure of one friction element against its companion when the toothed element is moved toward its companion, and manually controllable means for moving said toothed element toward and into interlocking engagement with its companion.

In testimony whereof I hereunto affix my signature.

EARL A. THOMPSON.